United States Patent
Propst et al.

(10) Patent No.: US 10,149,002 B1
(45) Date of Patent: Dec. 4, 2018

(54) SYSTEMS AND METHODS FOR RETRIEVING CONTENT FILES

(71) Applicant: Tribune Broadcasting Company, LLC, Chicago, IL (US)

(72) Inventors: Scott Allan Propst, Noblesville, IN (US); Dana A. Lasher, Morgan Hill, CA (US)

(73) Assignee: Tribune Broadcasting Company, LLC, Chicago, IL (US)

( * ) Notice: Subject to any disclaimer, the term of this patent is extended or adjusted under 35 U.S.C. 154(b) by 0 days.

(21) Appl. No.: 15/075,727

(22) Filed: Mar. 21, 2016

(51) Int. Cl.
| | |
|---|---|
| *H04N 21/434* | (2011.01) |
| *H04N 21/262* | (2011.01) |
| *H04N 21/458* | (2011.01) |
| *G11B 27/10* | (2006.01) |
| *H04N 21/845* | (2011.01) |
| *G06F 17/30* | (2006.01) |
| *H04N 21/84* | (2011.01) |

(52) U.S. Cl.
CPC ..... *H04N 21/4345* (2013.01); *G06F 17/3082* (2013.01); *G06F 17/3084* (2013.01); *G06F 17/30858* (2013.01); *G11B 27/10* (2013.01); *H04N 21/262* (2013.01); *H04N 21/458* (2013.01); *H04N 21/84* (2013.01); *H04N 21/8456* (2013.01)

(58) Field of Classification Search
CPC ....... H04N 21/23109; H04N 21/26258; H04N 21/26603; H04N 21/2665; H04N 21/274; H04N 21/2743; H04N 21/2747; H04N 21/278; H04N 21/27
See application file for complete search history.

(56) References Cited

U.S. PATENT DOCUMENTS

| | | | | |
|---|---|---|---|---|
| 5,383,112 A | * | 1/1995 | Clark | G06F 17/30017 705/28 |
| 5,576,755 A | * | 11/1996 | Davis | H04H 20/12 348/E17.001 |
| 5,652,615 A | * | 7/1997 | Bryant | H04H 20/103 725/143 |

(Continued)

OTHER PUBLICATIONS

Florical, "Florical Introduces TheQ at NAB 2014," http://www.florical.com/2014-March-25, Mar. 26, 2014. (2 pages).

*Primary Examiner* — Jonathan V Lewis
(74) *Attorney, Agent, or Firm* — McDonnell Boehnen Hulbert & Berghoff LLP (57) ABSTRACT

A video content provider may maintain its own servers for organizing and distributing its video content as digital files. The video content provider names the digital files according to its own file naming scheme and stores the digital files at particular file locations according to its own file storage scheme. A video-broadcast system analyzes a broadcast schedule to determine attributes of scheduled video content. Using the attributes, the video-broadcast system derives identifying information that the video content provider uses in the file paths and the file names of its digital files. The video-broadcast system uses this identifying information to generate the file paths and the file names for the digital files stored on the video content provider's servers. By automatically generating the file path and the file name for video content from attributes provided by the broadcast schedule, the video-broadcast system can efficiently and consistently retrieve the correct digital files.

12 Claims, 3 Drawing Sheets

(56) References Cited

U.S. PATENT DOCUMENTS

| | | | | |
|---|---|---|---|---|
| 5,666,645 A * | 9/1997 | Thomas | H04N 1/00098 | 348/723 |
| 5,886,731 A * | 3/1999 | Ebisawa | H04H 20/14 | 348/563 |
| 6,910,049 B2 * | 6/2005 | Fenton | G06F 17/3089 | |
| 7,024,681 B1 * | 4/2006 | Fransman | H04N 7/17327 | 348/E5.008 |
| 7,483,958 B1 * | 1/2009 | Elabbady | G06F 21/10 | 709/217 |
| 7,681,238 B2 * | 3/2010 | Plastina | G06F 17/30017 | 380/212 |
| 7,734,807 B2 * | 6/2010 | Shuster | H04L 47/29 | 709/224 |
| 8,214,516 B2 | 7/2012 | Gupta et al. | | |
| 8,291,083 B2 | 10/2012 | Black et al. | | |
| 8,620,724 B2 * | 12/2013 | Adhiraju | G06Q 10/067 | 705/7.36 |
| 9,201,922 B2 * | 12/2015 | Soroushian | G06F 15/16 | |
| 9,374,606 B2 * | 6/2016 | McKenna | H04N 21/4307 | |
| 9,437,243 B1 * | 9/2016 | Pan | G11B 27/322 | |
| 9,467,492 B2 * | 10/2016 | Mosko | H04L 9/3247 | |
| 9,549,203 B2 * | 1/2017 | Hughes | H04N 19/66 | |
| 9,584,557 B2 * | 2/2017 | Panje | H04L 65/60 | |
| 9,723,378 B2 * | 8/2017 | Zheng | H04N 21/4345 | |
| 2002/0032910 A1 * | 3/2002 | Hayasaka | H04H 60/04 | 725/115 |
| 2002/0147985 A1 * | 10/2002 | Miyajima | H04N 7/17318 | 725/109 |
| 2004/0154039 A1 * | 8/2004 | Simms | H04N 7/173 | 725/39 |
| 2004/0158858 A1 * | 8/2004 | Paxton | H04N 7/17336 | 725/42 |
| 2008/0244037 A1 * | 10/2008 | Okuda | H04N 7/17318 | 709/217 |
| 2009/0031335 A1 * | 1/2009 | Hendricks | H04N 7/163 | 725/1 |
| 2011/0072058 A1 * | 3/2011 | Tang | G06F 9/5055 | 707/823 |
| 2011/0295978 A1 * | 12/2011 | Pazos | H04H 20/426 | 709/219 |
| 2012/0041759 A1 * | 2/2012 | Barker | H04H 60/05 | 704/201 |
| 2014/0237520 A1 * | 8/2014 | Rothschild | H04N 21/236 | 725/88 |
| 2015/0052434 A1 * | 2/2015 | Ramaley | H04L 29/06027 | 715/716 |
| 2015/0113102 A1 * | 4/2015 | Pazos | H04H 20/426 | 709/219 |
| 2015/0261775 A1 * | 9/2015 | Shin | H04L 67/1097 | 707/827 |
| 2016/0065782 A1 * | 3/2016 | Mori | H04N 1/00244 | 358/403 |
| 2016/0127579 A1 * | 5/2016 | Ikeuchi | H04N 1/00244 | 358/1.15 |
| 2016/0328206 A1 * | 11/2016 | Nakaoka | G06F 3/16 | |

* cited by examiner

SYSTEMS AND METHODS FOR RETRIEVING CONTENT FILES

USAGE AND TERMINOLOGY

Throughout this application, with respect to all reasonable derivatives of such terms, and unless otherwise specified (and/or unless the particular context clearly dictates otherwise), each usage of:

"a" or "an" means at least one.

"the" means the at least one.

"video" means any material represented in a video format (i.e., having multiple frames). In some instances, video may include multiple sequential frames that are identical or nearly identical, and that may give the impression of a still image. Video may or may not include an audio portion.

"content" means any subject matter that can be displayed, played, or otherwise presented on any type of medium.

TECHNICAL FIELD

The disclosed systems and methods relate generally to the broadcast of content according to a broadcast schedule, and more particularly to retrieving, from content providers, digital files that correspond to the content specified by the broadcast schedule.

BACKGROUND

Unless otherwise indicated herein, the materials described in this section are not prior art to the claims in this disclosure and are not admitted to be prior art by inclusion in this section.

A video-broadcast system may broadcast a variety of video content. For instance, the video-broadcast system may broadcast different television programs and advertisements at specified times according to a broadcast schedule. The video-broadcast system may obtain the variety of video content from different video content providers. In many cases, the video-broadcast system retrieves the variety of video content as digital files from servers maintained by the different video content providers. For instance, a television program distribution company may distribute digital files for a particular syndicated television program through a server, and the video-broadcast system may access the server over a network to retrieve the digital files and to broadcast the syndicated television program.

SUMMARY

A video content provider may maintain its own servers for organizing and distributing video content as digital files. In such cases, each video content provider can determine the procedures by which a video-broadcast system can retrieve its video content. For instance, each video content provider may name the digital files according to its own file naming scheme and may store the digital files at particular file locations according to its own file storage scheme. A file location may indicate the server as well as the file path on the server where a digital file is stored. Accordingly, aspects of the present disclosure allow a video-broadcast system to retrieve digital files for particular video content from a video content provider. The video-broadcast system accesses the correct file location and identifies the appropriate digital file with the correct file name.

According to an example embodiment, a method for operating a video-broadcast system includes storing, on one or more data storage hardware, a broadcast schedule specifying transmission of a plurality of video content at respective broadcast times. The broadcast schedule provides one or more attributes for each video content. For at least one of the video content, the method includes storing, on the one or more data storage hardware, a file naming scheme for generating a file name for a digital file associated with the at least one video content. The file naming scheme incorporates, into the file name, a set of information identifying the at least one video content. The digital file associated with the at least one video content is stored on a corresponding (and perhaps remote) server according to the file name. Additionally, the method includes determining, by a controller, the one or more attributes for the at least one video content from the broadcast schedule. Furthermore, the method includes determining, by the controller, the set of information to be incorporated into the file name for the digital file associated with the at least one video content. The set of information is determined from the one or more attributes for the at least one video content. The method also includes generating, by the controller, the file name for the digital file associated with the at least one video content. The file name is generated from the file naming scheme and the set of information. In addition, the method includes locating, by the controller, the digital file associated with the at least one video content according to the generated file name. The digital file is located over a network communicatively coupled to the corresponding server. Furthermore, the method includes retrieving over the network, by the controller, the digital file associated with the at least one video content according to the generated file name. Additionally, the method includes transmitting, with the controller, the plurality of video content via a transmission system to at least one end-user device at the respective broadcast times.

In some cases, the method includes storing, on the one or more data storage hardware, a file storage scheme for the at least one video content. The file storage scheme specifies a location name for storing the digital file associated with the at least one video content. The file storage scheme incorporates, into the location name, a second set of information identifying the at least one video content. The method also includes determining, by the controller, the second set of information to be incorporated into the location name for the digital file associated with the at least one video content. The second set of information is determined from the one or more attributes for the at least one video content. In addition, the method includes generating, by the controller, the location name for the digital file associated with the at least one video content, the location name being generated from the file storage scheme and the second set of information. The digital file associated with the at least one video content is further located and retrieved over the network, by the controller, according to the generated location name.

In another embodiment, a video-broadcast system includes one or more data storage hardware configured to store: (i) a broadcast schedule specifying transmission of a plurality of video content at respective broadcast times, the broadcast schedule providing one or more attributes for each video content; and (ii) a file naming scheme for generating a file name for a digital file associated with at least one of the video content, the file naming scheme incorporating, into the file name, a set of information identifying the at least one video content, the digital file associated with the at least one video content being stored on a corresponding server according to the file name. The video-broadcast system also includes a controller communicatively coupled, over a network, to the server corresponding to the at least one video content. The controller is configured to: (i) determine, from the broadcast schedule, the one or more attributes for the at least one video content; (ii) determine, from the one or more attributes for the at least one video content, the set of information to be incorporated into the file name for the digital file associated with the at least one video content; (iii) generate, from the file naming scheme and the set of information, the file name for the digital file associated with the at least one video content; (iv) locate, over the network communicatively coupled to the corresponding server, the digital file associated with the at least one video content according to the generated file name; (v) retrieve, over the network, the digital file associated with the at least one video content according to the generated file name; and (vi) transmit the plurality of video content via a transmission system to at least one end-user device at the respective broadcast times.

In some cases, the one or more data storage hardware is further configured to store a file storage scheme for the at least one video content. The file storage scheme specifies a location name for storing the digital file associated with the at least one video content. The file storage scheme incorporates, into the location name, a second set of information identifying the at least one video content. The controller is further configured to: (i) determine the second set of information to be incorporated into the location name for the digital file associated with the at least one video content, the second set of information being determined from the one or more attributes for the at least one video content; (ii) generate the location name for the digital file associated with the at least one video content, the location name being generated from the file storage scheme and the second set of information; and (iii) further locate and retrieve, over the network, the digital file associated with the at least one video content according to the generated location name.

Yet another embodiment provides a non-transient computer readable medium for a video-broadcast system. The video-broadcast system including one or more data storage hardware configured to store: (i) a broadcast schedule specifying transmission of a plurality of video content at respective broadcast times, the broadcast schedule providing one or more attributes for each video content; and (ii) a file naming scheme for generating a file name for a digital file associated with at least one of the video content, the file naming scheme incorporating, into the file name, a set of information identifying the at least one video content, the digital file associated with the at least one video content being stored on a corresponding server according to the file name. The computer readable medium contains program instructions for causing a controller to perform the method of: (i) determining, from the broadcast schedule, the one or more attributes for the at least one video content; (ii) determining, from the one or more attributes for the at least one video content, the set of information to be incorporated into the file name for the digital file associated with the at least one video content; (iii) generating, from the file naming scheme and the set of information, the file name for the digital file associated with the at least one video content; (iv) locating, over the network communicatively coupled to the corresponding server, the digital file associated with the at least one video content according to the generated file name; (v) retrieving, over the network, the digital file associated with the at least one video content according to the generated file name; and (vi) transmitting the plurality of video content via a transmission system to at least one end-user device at the respective broadcast times.

In some cases, the one or more data storage hardware further stores a file storage scheme for the at least one video content. The file storage scheme specifies a location name for storing the digital file associated with the at least one video content. The file storage scheme incorporates, into the location name, a second set of information identifying the at least one video content. The computer readable medium contains further program instructions for causing the controller to perform the method of: (i) determining the second set of information to be incorporated into the location name for the digital file associated with the at least one video content, the second set of information being determined from the one or more attributes for the at least one video content; (ii) generating the location name for the digital file associated with the at least one video content, the location name being generated from the file storage scheme and the second set of information; and (iii) further locating and retrieving, over the network, the digital file associated with the at least one video content according to the generated location name.

These as well as other aspects, advantages, and alternatives, will become apparent to those of ordinary skill in the art by reading the following detailed description, with reference where appropriate to the accompanying drawings.

DETAILED DESCRIPTION OF THE DRAWINGS

I. Overview

A video-broadcast system may broadcast a variety of video content. For instance, the video-broadcast system may broadcast different television programs and advertisements at specified times according to a broadcast schedule. The video-broadcast system may obtain the variety of video content from different video content providers. In many cases, the video-broadcast system retrieves the variety of video content as digital files from servers maintained by the different video content providers. For instance, a television program distribution company may distribute digital files for a particular syndicated television program through a server, and the video-broadcast system may access the server over a network to retrieve the digital files and to broadcast the syndicated television program.

Each video content provider may maintain its own servers for organizing and distributing its video content as digital files. In such cases, each video content provider determines the procedures by which a video-broadcast system can retrieve its video content. For instance, each video content provider names the digital files according to its own file naming scheme and stores the digital files at particular file locations according to its own file storage scheme. A file location may indicate the server as well as the file path on the server where a digital file is stored. Thus, to retrieve digital files for particular video content from a video content provider, a video-broadcast system can access the correct file location by referring to the provider's specific file storage scheme. Additionally, the video-broadcast system can identify the appropriate digital files by referring to the provider's specific naming scheme and determining the correct file names.

For each video content provider, the video-broadcast system may have to accommodate different file storage and file naming schemes. As more video content providers are used, keeping track of the different file storage and file naming schemes becomes a challenge and retrieving video content with correct file paths and file names becomes more difficult.

To organize digital video content files, video content providers may use file paths and file names that provide some identifying information about the respective video content. For example, the file path for an episode of a serial television show may include a directory (or file folder) with the name of the serial television show and the file name may include an episode number for the television show. Such information allows the video content to be more easily identified by the corresponding file path and the file name.

A video-broadcast system employs a broadcast schedule to determine what video content is broadcast at specified times. To ensure that the video-broadcast system broadcasts the correct video content at specified times, the broadcast schedule provides attributes that identify the video content. For example, to schedule an episode of a serial television show, the broadcast schedule may provide the name of the serial television show, the season number, and the episode number as attributes.

The attributes for particular video content in a broadcast schedule may be similar to the identifying information in the file path and the file name used by the video content provider. As such, a video broadcast system can analyze the broadcast schedule to determine attributes of scheduled video content. Using the video content attributes, the video-broadcast system can derive the identifying information used in the file path and the file name of the corresponding digital file. Knowing the file storage scheme and the file naming scheme used by the video content provider, the video-broadcast system can use this identifying information to generate the file path and the file name for the digital file stored on the video content provider's servers. By automatically generating the file path and the file name for video content from attributes provided by the broadcast schedule, the video-broadcast system can efficiently and consistently retrieve the correct digital file.

II. Example Video-Broadcast System

Figure 1:
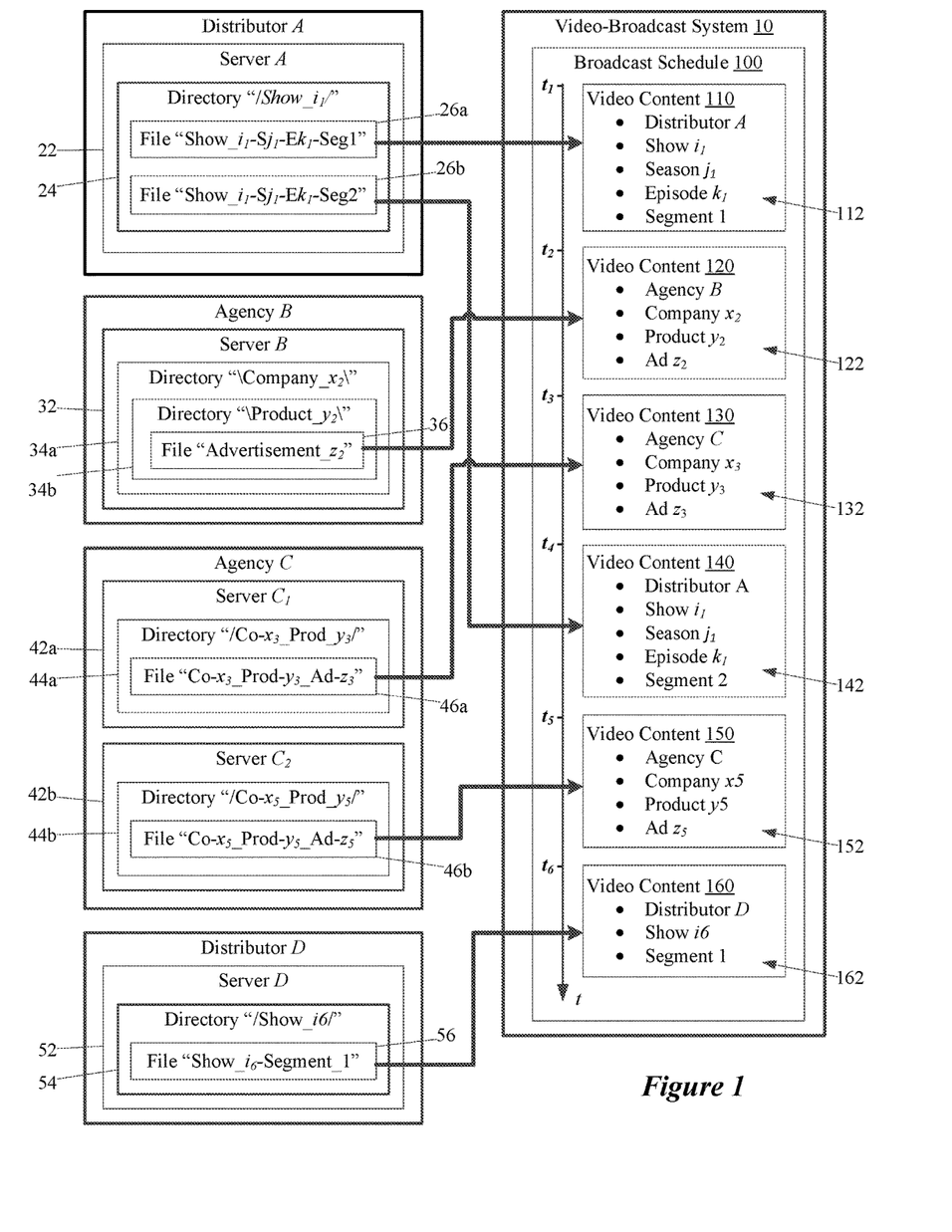
FIG. 1 illustrates an example video-broadcast system that broadcasts video content according to a broadcast schedule, where the video content is retrieved as digital files from servers maintained by video content providers.
Figure 2:
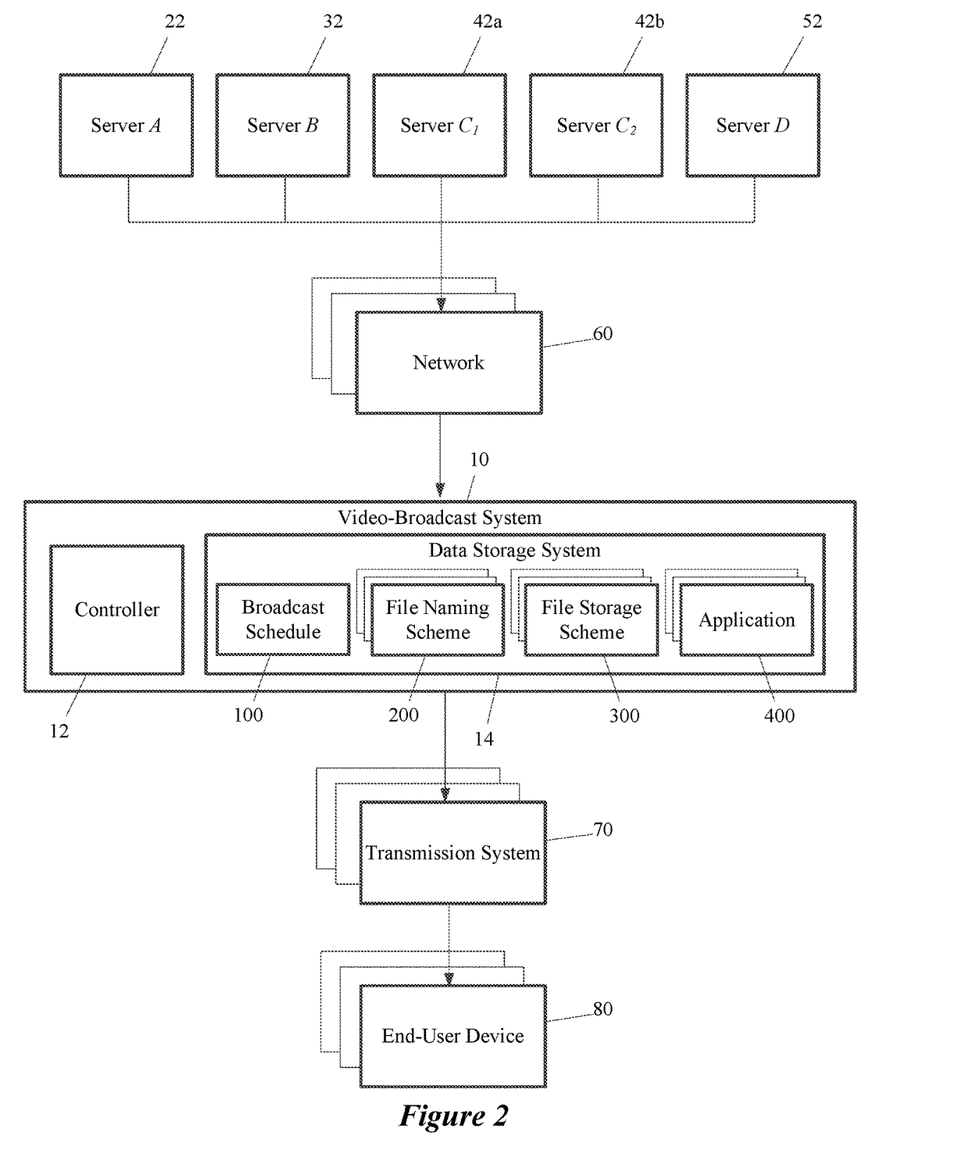
FIG. 2 illustrates the example video-broadcast system of FIG. 1 retrieving and broadcasting the video content from the video content providers.

FIGS. 1 and 2 illustrate an example video-broadcast system 10. The video-broadcast system 10 transmits television programming to any number of end-user devices 80 over one or more transmission systems 70. The end-user devices 80 may include set top boxes, televisions, monitors, smart devices, or other devices capable of presenting or facilitating the presentation of video content to viewers. The video-broadcast system 10, for instance, may transmit the television programming to viewers via analog and/or digital over-the-air signals. Additionally or alternatively, the video-broadcast system 10 may transmit the television programming to viewers over cable and/or satellite systems.

As illustrated in FIG. 1, the video-broadcast system 10 employs a broadcast schedule 100. The broadcast schedule 100 specifies the video content that the video-broadcast system 10 transmits at particular times. According to the broadcast schedule 100, the video-broadcast system 10 transmits video content 110 at time $t=t_1$, video content 120 at time $t=t_2$, video content 130 at time $t=t_3$, video content 140 at time $t=t_4$, video content 150 at time $t=t_5$, and video content 160 at time $t=t_6$.

The video content 110, 140, and 160 include programming intended to interest and attract viewers. In particular, the video content 110 and 140 relate to an episode $k_1$ from a season $j_1$ of a serial television program $i_1$. For instance, the serial television program $i_1$ may be a syndicated television program. Meanwhile, the video content 160 relates to a non-serial program $i_6$, such as a movie. In general, however, the video-broadcast system 10 may broadcast any type of programming including, but not limited to, made-for-television programming, movies, sporting events, news programs, documentaries, or the like.

According to practice in commercial television programming, the video-broadcast system 10 also broadcasts advertisements (also referred to as commercials) to generate revenue. The video content 120 includes advertisement $z_2$ for a product $y_2$ sold by a company $x_2$. The video content 130 includes advertisement $z_3$ for a product $y_3$ sold by a company $x_3$. The video content 150 includes advertisement $z_5$ for a product $y_5$ sold by a company $x_5$. As the broadcast schedule 100 specifies, the video-broadcast system 10 broadcasts the advertisements in the video content 120, 130, and 150 during breaks from the shows in the video content 110, 140, and 160.

In some instances, the video-broadcast system 10 may transmit a show that is divided into two or more segments, and the video-broadcast system 10 broadcasts advertisements between segments of the show. For instance, according to the broadcast schedule 100, the video content 110 includes a first segment 1 of the episode $k_1$ from the season $j_1$ of the show $i_1$, and the video content 140 includes a second segment 2 of the same episode $k_1$ from the season $j_1$ of the show $i_1$. The content in the second segment 2 resumes where the content of the first segment 1 end. The video-broadcast system 10 broadcasts the advertisement $z_2$ in the video content 120 and the advertisement z3 in the video content 130 between the first segment 1 and the second segment 2. On the other hand, the video-broadcast system 10 broadcasts the advertisement $z_5$ in the video content 150 between the show $i_1$ in the video content 140 and a different show $i_6$ in the video content 160.

The video-broadcast system 10 can retrieve a variety of video content from different video content providers. The video content providers may maintain their own servers for distributing their video content as digital files. As shown in FIG. 1, for instance, a television program distributor A maintains a server 22 that stores digital files 26a and 26b corresponding to the video content 110 and 140, respectively. An advertising agency B maintains a server 32 that stores a digital file 36 corresponding to the video content 120. Another advertising agency C maintains a first server 42a that stores a digital file 46a corresponding to the video content 130 and a second server 42b that stores a digital file 46b corresponding to the video content 150. Another television program distributor D maintains a server 52 that stores a digital file 56 corresponding to the video content 160.

As FIG. 2 illustrates, one or more networks 60 communicatively couple the video-broadcast system 10 to the servers 22, 32, 42a, 42b, and 52 and allow the video-broadcast system 10 to retrieve the digital files 26a, 26b, 36, 46a, 46b, and 56. For example, the servers 22, 32, 42a, 42b, and 52 can be located on the one or more networks 60 by an Internet protocol (IP) address. The one or more networks 60 may include a wide-area network (WAN), such as the Internet, a local-area network (LAN), etc. The one or more networks 60 may provide wired and/or wireless communications. The one or more networks 60 may employ hypertext transfer protocol (HTTP), file transfer protocol (FTP), and/or any other protocol or technique that allows the effective transfer of data between the video-broadcast system 10 and the video content providers.

The video-broadcast system 10 includes a controller 12 that controls the retrieval and transmission of video content according to the broadcast schedule 100. In addition, the video-broadcast system 10 includes data storage hardware 14 for storing the digital files retrieved from the video content providers. The data storage hardware 14 also stores the broadcast schedule 100 as well as video-broadcast applications 400. The video-broadcast applications 400 provide programmed instructions that determine how the controller 12 retrieves and transmits the video content.

III. Example System for Storing and Naming Digital Files for Video Content

As described above, each video content provider maintains its own server(s) for organizing and distributing its video content as digital files. Thus, each video content provider determines the procedures by which the video-broadcast system 10 can retrieve the provider's video content. Specifically, each video content provider names the digital files according to its own file naming scheme and stores the digital files at particular file locations according to its own file storage scheme. The filing naming scheme specifies any number of rules to standardize the naming of the digital files, while the file storage scheme specifies any number of rules to standardize the location and organization of the digital files. A file location indicates the server as well as the file path on the server where a digital file is stored. Thus, to retrieve digital files for particular video content from a video content provider, the video-broadcast system 10 can access the correct file path by referring to the provider's specific file storage scheme. Additionally, the video-broadcast system 10 can identify the appropriate digital files by referring to the provider's specific naming scheme and determining the correct file names.

To organize digital video content files, video content providers may use file paths and file names that provide some identifying information about the respective video content. Such information allows the video content to be more easily identified by the corresponding file path and the file name.

For example, to store digital files for episodes of a serial television show, the television program distributor A employs a file storage scheme that specifies the server and employs a directory incorporating the name of the serial television show. The name of the directory can be generally expressed as:

"/Show_"+[show name]+"/" (A1)

Thus, as shown in FIG. 1, the file path on the server 22 for the digital files 26a and 26b for the same show $i_1$ includes a directory 24 named "/Show_$i_1$/". In some cases, the directory 24 may be a subdirectory under one or more other directories on the server 22.

Additionally, to name digital files for episodes of a serial television show, the television program distributor A employs a file naming scheme that incorporates information on the name of the show, the season number, the episode number, and the segment number. The file name can be generally expressed as:

"Show_"+[show name]+"-S"+[season number]+"-E"+[episode number]+"-Seg"+[segment number] (A2)

The file naming scheme here also includes the segment number for a show that is divided into segments to allow advertising to be broadcast during the show. Thus, as shown in FIG. 1, the file name for the digital file 26a is "Show_$i_1$-Sj$_1$-Ek$_1$-Seg1" and the file name for the digital file 26b is "Show_$i_1$-Sj$_1$-Ek$_1$-Seg2." Correspondingly, the video-broadcast system 10 can find the digital file 26a at "../Show_$i_1$/Show_$i_1$-Sj$_1$-Ek$_1$-Seg1" and the digital file 26b at "../Show_$i_1$/Show_$i_1$-Sj$_1$-Ek$_1$-Seg2" on the server 22.

To store digital files for advertisements, the advertising agency B employs a file storage scheme that specifies the server and employs a directory incorporating the name of the company selling the product and a sub-directory with the name of the product. The name of the directory can be generally expressed as:

"\Company_"+[company name]+"\Product_"+[product name]+"\" (B1a)

The name of the sub-directory can be generally expressed as:

"\Product_"+[product name]+"\" (B1b)

Thus, the file path for the digital file 36 on the server 32 includes a directory 34a named "\Company_$x_2$\" and a sub-directory 34b named "\Product_$y_2$\." In some cases, the directory 34a may also be a sub-directory under one or more additional directories on the server 32.

Additionally, to name digital files for advertisements, the advertising agency B employs a file naming scheme that incorporates a unique identifier for the advertisement. Because several advertisements may be created to market a single product, an advertisement may be associated with a unique identifier (e.g., $z_2$), which may be a serial number, date stamp, or the like. The file name can be generally expressed as:

"Advertisement_"+[advertisement identifier] (B2)

Thus, the file name for the digital file 36 is "Advertisement_$z_2$." Correspondingly, the video-broadcast system 10 can find the digital file 36 at "..\Company_$x_2$\Product_$y_2$\Advertisement_$z_2$."

On the other hand, to store digital files for advertisements, the advertising agency C employs a file storage scheme that specifies the server and employs a directory incorporating the name of the company selling the product and the name of the product. The name of the directory can be generally expressed as:

"/Co-"+[company name]+"_Prod-"+[product name]+"/" (C1)

Thus, the file path on the server 42a for the digital file 46a includes a directory 44a named "/Co-$x_3$_Prod-$y_3$/", and the file path on the server 42b for the digital file 46b includes a directory 44b named "/Co-$x_5$_Prod-$y_5$/". In some cases, the directories 42a and 42b may be subdirectories under one or more additional directories on their respective servers 42a and 42b.

Additionally, to name digital files for advertisements, the advertising agency C employs a file naming scheme that incorporates the name of the company selling the product, the name of the product, and a unique identifier for the advertisement. The file name can be generally expressed as:

"Co-"+[company name]+"_Prod-"+[product name]+ "_Ad-"+[advertisement identifier]     (C2)

Thus, the file name for the digital file 46a is "Co-$x_3$_Prod-$y_3$_Ad-$z_3$" and the file name for the digital file 46b is "Co-$x_5$_Prod-$y_5$_Ad-$z_5$." Correspondingly, the video-broadcast system 10 can find the digital file 46a at "../Co-$x_3$_Prod-$y_3$/Co-$x_3$_Prod-$y_3$_Ad-$z_3$" on the server 42a and the digital file 46b at "../Co-$x_5$_Prod-$y_5$/Co-$x_5$_Prod-$y_5$_Ad-$z_5$" on the server 42b.

To store digital files for non-serial television shows divided into segments, the television program distributor D employs a file storage scheme that specifies the server and employs a directory incorporating the name of the show. The name of the directory can be generally expressed as:

"\Show_"+[show name]+"\"     (D1)

Thus, the file path on the server 52 for the digital file 56 includes a directory 54 named "/Show_$i_6$/". In some cases, the directory 54 may be a subdirectory under one or more other directories on the server 52.

Additionally, to name digital files for non-serial television shows divided into segments, the television program distributor D employs a file naming scheme that incorporates the name of the show and the segment number. The file name can be generally expressed as:

"Show_"+[show name]+"-Segment_"+[segment number]     (D2)

Thus, the file name for the digital file 56 is "Show_$i_6$-Segment_1." Correspondingly, the video-broadcast system 10 can find the digital file 56 at "..\Show_$i_6$\Show_$i_6$-Segment_1" on the server 52.

III. Example System for Retrieving Digital Files for Video Content

As the example file paths and file names above demonstrate, video content providers can employ many different file storage and file naming schemes for their digital files. Indeed, file storage and file naming schemes can vary from the examples above and can have varying levels of complexity. Video content providers may customize their file storage and file naming schemes to meet their own specific needs and preferences. Furthermore, different server systems may impose different requirements on the file storage and file naming schemes. For example, different server operating systems may employ different syntax for file paths and/or file names.

For each video content provider, the video-broadcast system 10 may have to accommodate different file storage and file naming schemes. As more video content providers are used to broadcast a greater variety of video content, keeping track of the different file storage and file naming schemes can become very inefficient, and the likelihood of using incorrect file paths and file names to retrieve digital files can increase. To address these challenges, the video-broadcast system 10 employs a robust and scalable approach for determining the correct file paths and files names for retrieving digital files from many different video content providers.

Figure 3:
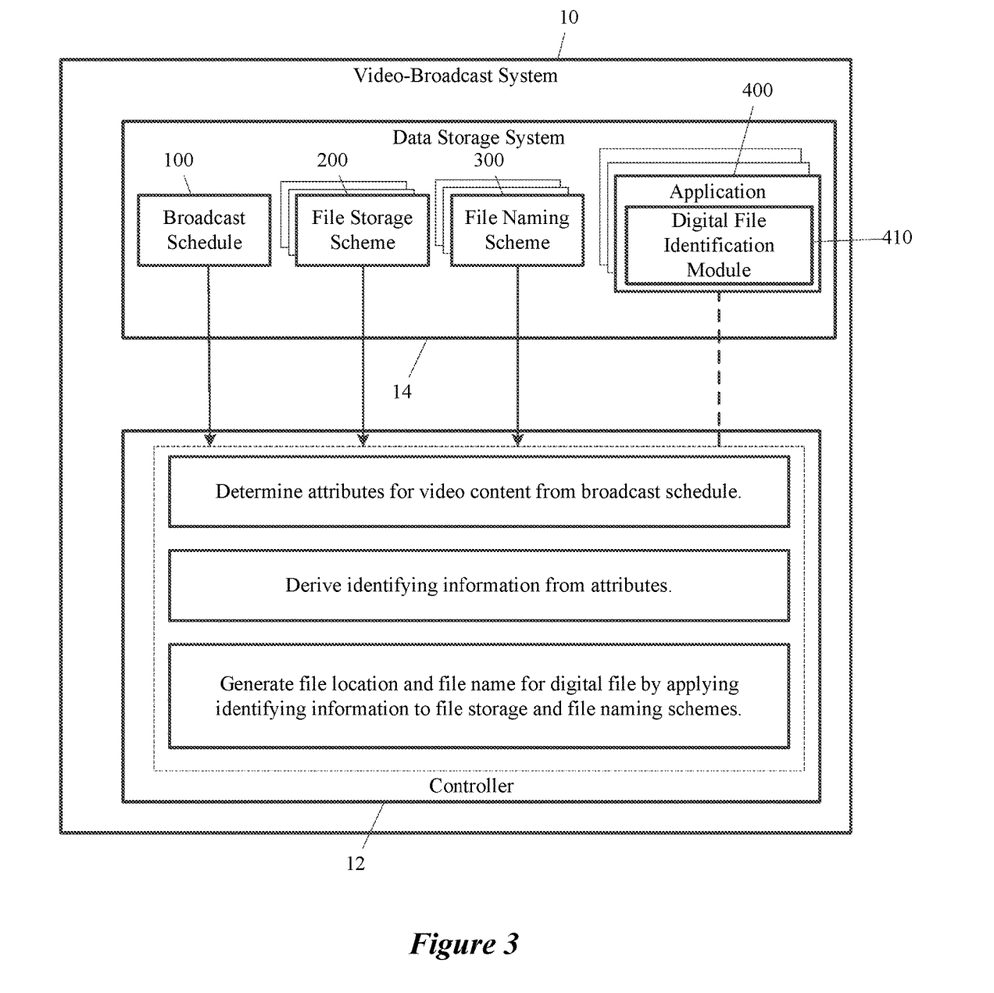
FIG. 3 illustrates an example application module that allows the video-broadcast system of FIG. 1 to generate identifiers for the digital files and to retrieve the video content from the servers maintained by the video content providers.

As shown in FIG. 3, the video-broadcast applications 400 stored on the data storage hardware 14 include a digital file identification module 410. The module 410 provides the controller 12 with programmed instructions for determining the correct file paths and files names for video content specified by the broadcast schedule 100.

When executed by the controller 12, the module 410 receives the broadcast schedule 100 as input. As described above, the video-broadcast system 10 employs the broadcast schedule 100 to determine what video content should be transmitted at specified times. To ensure that the correct video content is transmitted, the broadcast schedule 100 specifies attributes that identify the video content. As shown in FIG. 1, the broadcast schedule 100 specifies attributes 112, 122, 132, 142, 152, and 162 for the video content 110, 120, 130, 140, 150, and 160, respectively.

In particular, the attributes 112 for the video content 110 provide the name of the television program distributor A, the server 22 for retrieving the corresponding digital file 26a, the name of the show $i_1$, the season number $j_1$, and the episode number $k_1$, and the segment number 1. Correspondingly, the attributes 142 for the related video content 140 provide the name of the television program distributor A, the server 22 for retrieving the corresponding digital file 26b, the name of the show $i_1$, the season number $j_1$, and the episode number $k_1$, and the segment number 2. On the other hand, the attributes 162 for the video content 160 provide the name of the television program distributor D, the server 52 for retrieving the corresponding digital file 56, the name of the show i6, and the segment number 1.

Meanwhile, the attributes 122 for the video content 120 provide the name of the advertising agency B, the server 32 for retrieving the corresponding digital file 36, the name of the company $x_2$, the name of the advertised product $y_2$, and the identifier for the advertisement $z_2$. The attributes 132 for the video content 130 provide the name of the advertising agency C, the server 42a for retrieving the corresponding digital file 46a, the name of the company $x_3$, the name of the advertised product $y_3$, and the identifier for the advertisement $z_3$. The attributes 152 for the video content 150 include the name of the advertising agency C, the server 42b for retrieving the corresponding digital file 46b, the name of the company $x_5$, the name of the advertised product $y_5$, and the identifier for the advertisement $z_5$.

The attributes 112, 122, 132, 142, 152, and 162 for the video content 110, 120, 130, 140, 150, and 160 in the broadcast schedule 100 are similar to the information that the video content providers A, B, C, and D use in the file paths and the file names for the digital files 26a, 26b, 36, 46a, 42b, and 56, respectively. Thus, with the module 410, the controller 12 can analyze the broadcast schedule 100 to determine the attributes 112, 122, 132, 142, 152, and 162 of the scheduled video content 110, 120, 130, 140, 150, and 160, respectively. Using the attributes 112, 122, 132, 142, 152, and 162, the controller 12 can also derive the identifying information used in the file paths and the file names for the corresponding digital files 26a, 26b, 36, 46a, 46b, and 56, respectively.

As shown in FIGS. 2 and 3, the data storage hardware 14 also stores file storage schemes 200 and file naming schemes 300, which the video content providers A, B, C, and D use to organize and distribute their digital files 26a, 26b, 36, 46a, 46b, and 56. For instance, the file storage schemes 200 include the expressions (A1), (B1a), (B1b), (C1), and (D1) above, and the file naming schemes 300 include the expressions (A2), (B2), (C2), and (D2) above. The file storage schemes 200 and file naming schemes 300 can be stored, for instance, as one or more tables in a database, flat files, etc. In some cases, a single table can contain all file storage schemes 200 and file naming schemes 300, indexed according to the names of the video content providers. Storing the file storage schemes 200 and the file naming schemes 300 centrally in one or more tables on the data storage hardware 14 allows the information to be more easily updated and managed according to a set of standardized procedures. Such an approach promotes the consistent use of correct file storage and naming schemes.

When executed by the controller 12, the module 410 receives the file storage schemes 200 and file naming schemes 300 as input. With the module 410, the controller 12 can apply the file storage schemes 200 and file naming schemes 300 to the identifying information derived from the attributes provided by the broadcast schedule 100. In this way, the controller 12 can generate the specific file paths and file names for the digital files 26a, 26b, 36, 46a, 46b, and 56.

For instance, the broadcast schedule provides the attributes 112 for video content 110 scheduled to be transmitted at time $t_1$. The attributes 112 include the name of the video content provider server, i.e., television program distributor A. Using the name of the video content provider 110, the controller 12 can determine the expressions (A1) and (A2) from the file storage schemes 200 and the file naming schemes 300 stored in the data storage hardware 14. The attributes 112 also include the name of the show, the season number, the episode number, and the segment number. Thus, the controller 12 can apply the attributes 112 to the expressions (A1) and (A2) above to determine the directory 24 and the name of the digital file 26a.

Similarly, the controller 12 can determine the expressions (B1) and (B2) above from the name of the video content provider, i.e., advertising agency B, provided by the attributes 212 and can apply the other attributes 212 to the expressions (B1a), (B1b), and (B2) to determine the directory 34a, the sub-directory 34b, and the name of the digital file 36. The controller 12 can determine the expressions (C1) and (C2) above from the name of the video content provider, i.e., advertising agency C, provided by the attributes 312 and can apply the other attributes 312 to the expressions (C1) and (C2) to determine the directory 44a and the name of the digital file 46a. The controller 12 can determine the expressions (A1) and (A2) from the name of the video content provider, i.e., television program distributor A, provided by the attributes 412 and can apply the other attributes 412 to the expressions (A1) and (A2) to determine the directory 24 and the name of the digital file 26b. The controller 12 can determine the expressions (C1) and (C2) from the name of the video content provider, i.e., advertising agency C, provided by the attributes 512 and can apply the other attributes 512 to the expressions (C1) and (C2) to determine the directory 44b and the name of the digital file 46b. The controller 12 can determine the expressions (D1) and (D2) from the name of the video content provider, i.e., television program distributor D, and can apply the other attributes 612 to the expressions (D1) and (D2) to determine the directory 54 and the name of the digital file 56.

In general, the broadcast schedule 100 can provide any attributes to allow the controller 12, when executing the module 410, to determine the file storage locations and file names from the file storage schemes 200 and the file naming schemes 300. In some cases, the broadcast schedule 100 can provide attributes that directly translate to identifying information used in the file storage schemes 200 and the file naming schemes 300. For example, the attributes 112 include the name of the show, the season number, the episode number, and the segment number, which can be used directly for [show name], [season number], [episode number], and [segment number] in the expressions (A1) and (A2).

In other cases, the controller 12, when executing the module 410, may conduct additional analysis to determine some of the identifying information from the attributes provided by the broadcast schedule 100. For example, rather than expressly specifying the segments numbers 1 and 2 for the show $i_6$, the broadcast schedule 100 may indicate that episode $k_1$ of season $j_1$ is being broadcast with a start time of $t_1$. The broadcast schedule 100 also indicates that the advertisement in the video content 150 is scheduled at time $t_5$ and another show $i_6$ in the video content 160 is scheduled at time $t_6$. Thus, the controller 12 can determine that the broadcast of the show $i_1$ ends at time $t_5$. The broadcast schedule 100 further indicates that the advertisements in the video content 120 and 130 are scheduled for time $t_2$ and $t_3$, respectively. The controller 12 can determine that the show $i_1$ is broadcast from time $t_1$ to time $t_2$ and again from the end of the video content 130 to time $t_5$. As such, the controller 12 can determine indirectly from the broadcast schedule 100 that two segments for the show $i_1$ should be retrieved. In other words, the controller 12 in this example can evaluate one or more first attributes expressly provided by the broadcast schedule 100 to determine one or more second attributes, i.e., segment numbers 1 and 2, that are not expressly provided by the broadcast schedule 100.

In another example, an advertising agency B may employ a file naming scheme that includes a date stamp in the advertisement identifier $z_2$. In this way, the advertising agency B can provide different advertisements for the same product y2 from the company x2 depending on the date. The controller 12 can refer to a network time protocol (NTP) or other resource to determine this attribute of the video content 120 without relying on the broadcast schedule 100 to provide the date stamp expressly.

Furthermore, the data storage hardware 14 may store additional data that allows the controller 12 to derive some of the identifying information in the file storage schemes 200 and the file naming schemes 300. For instance, the broadcast schedule 100 might not expressly provide the name of the video content provider for the show $i_1$. Rather, the broadcast schedule 100 provides the name of the show $i_1$ in the attributes 112, and the controller 12 can use the name of the show $i_1$ to determine the video content provider from data, e.g., a table, stored on the data storage hardware 14.

By automatically generating the file path and the file name for video content from attributes provided by the broadcast schedule, the video-broadcast system can efficiently and consistently retrieve the correct digital file. Advantageously, the automated process allows the video-broadcast system 10 to control when the digital files are retrieved. In particular, the video-broadcast system 10 can be systematically programmed to retrieve the digital files in their entirety at regular intervals prior to their scheduled broadcast times. For instance, each digital file can be retrieved six hours prior to its scheduled broadcast time. Accordingly, the video-broadcast system 10 can manage how it uses the data storage hardware 14 to store digital files from video content providers. Rather than retrieving digital files in large batches, the video-broadcast system 10 can retrieve each digital file only when needed and can reduce the amount of data storage it uses at a given time.

Although the examples above may relate to the broadcast of video content, such as television programming, it is understood that other types of content can be transmitted according to aspects of the present disclosure. For instance, audio content may be similarly retrieved from audio content providers as digital files and broadcast according to a broadcast schedule. Such audio content may be transmitted on over-the-air radio, satellite radio, cable radio, or the like.

In general, aspects of the present disclosure may also apply to content retrieved from any source and transmitted for example through television broadcasts, video-on-demand, online streaming, download from online sites, radio broadcasts, fixed storage media (e.g., DVD's, CD's, tapes, etc.), or the like.

Although the examples above may determine both file storage locations and file names for retrieving digital files, it is understood that in other systems digital files can be retrieved by determining either a file storage location or a file name. For instance, a video content provider may store all digital files in a common location, so that it is unnecessary to determine a file storage location, and digital files can be accessed and retrieved according to their file names only.

Devices, such as the controller 12 or servers 22, 32, 42a, 42b, and 52, may be employed to process information and/or control various aspects of example embodiments. Such processing/control devices may be implemented as a combination of hardware and software elements. The hardware elements may include combinations of operatively coupled hardware components, including microprocessors, memory, signal filters, circuitry, etc. The processors may be configured to perform operations specified by the software elements, e.g., computer-executable code stored on a non-transient computer readable medium. The processors may be implemented to provide functionality and operation according to the present disclosure. The processors may be implemented in any number of physical devices/machines. Indeed, parts of the processing of the example embodiments can be distributed over any combination of processors for better performance, reliability, cost, etc. The physical devices/machines can be implemented by the preparation of integrated circuits or by interconnecting an appropriate network of conventional component circuits, as is appreciated by those skilled in the electrical art(s). The physical devices/machines, for example, may include field programmable gate arrays (FPGA's), application-specific integrated circuits (ASIC's), digital signal processors (DSP's), etc.

Appropriate software, e.g., the digital file identification module 410, can be readily prepared based on the teachings of the example embodiments. Thus, the example embodiments are not limited to any specific combination of hardware circuitry and/or software. Stored on one computer readable medium or a combination of computer readable media, e.g., the data storage hardware 14, the software may control the devices and subsystems of the example embodiments, drive the devices and subsystems of the example embodiments, enable the devices and subsystems of the example embodiments to interact with a human user (user interfaces, displays, controls), etc. Such software can include, but is not limited to, device drivers, operating systems, development tools, applications software, etc. A computer readable medium further can include the computer program product(s) for performing all or a portion of the processing performed by the example embodiments. Computer program products employed by the example embodiments can include any suitable interpretable or executable code mechanism, including but not limited to complete executable programs, interpretable programs, scripts, dynamic link libraries (DLLs), applets, etc. The processors may include, or be otherwise combined with, computer-readable media. Some forms of computer-readable media may include, for example, a hard disk, any other suitable magnetic medium, any suitable optical medium, RAM, PROM, EPROM, flash memory, any other suitable memory chip or cartridge, any other suitable non-volatile memory, a carrier wave, or any other suitable medium from which a computer can read.

The processing/control devices may also employ databases for storing data, e.g., the broadcast schedule 100, the file storage schemes 200, and the file naming schemes 300. Such databases may be stored on the computer readable media described above and may organize the data according to any appropriate approach. For example, the data may be stored in relational databases, navigational databases, flat files, lookup tables, etc.

The computer readable media described above may also be employed to store and organize digital files, such as the digital files 26a, 26b, 36, 46a, 46b, and 56 stored on the corresponding servers 22, 32, 42a, 42b, and 52.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

Also, the functions need not be performed in the disclosed order, although in some examples, an order may be preferred. And not all functions need to be performed to achieve the desired advantages of the disclosed system and method, and therefore not all functions are required.

It should also be noted that the variations described in connection with select examples of the disclosed system and method may be applied to all other examples of the disclosed system or method.

Further, while select examples of the disclosed system and method have been described, alterations and permutations of these examples will be apparent to those of ordinary skill in the art. Other changes, substitutions, and alterations are also possible without departing from the disclosed system and method in its broader aspects as set forth in the following claims.

What is claimed is:

1. A method for operating a video-broadcast system, the method comprising:
storing, on one or more data storage hardware, a broadcast schedule specifying transmission of a plurality of video content at respective broadcast times, the broadcast schedule specifying one or more first attributes for each video content;
for at least one of the video content:
obtaining, from the one or more data storage hardware and by a controller, a first set of rules that generates a file name for a digital file associated with the at least one video content, the digital file associated with the at least one video content being stored on a corresponding server according to the file name, wherein the file name is not specified by the broadcast schedule;
determining, by the controller, the one or more first attributes for the at least one video content from the broadcast schedule;
obtaining, from the one or more data storage hardware and by the controller, a second set of rules, that generate, from the one or more first attributes, one or more second attributes that are not specified by the broadcast schedule;
applying the second set of rules to the one or more first attributes to generate the one or more second attributes;
generating, by the controller, the file name for the digital file associated with the at least one video content by applying the first set of rules to the one or more first attributes and the one or more second attributes, including:
  determining a set of information identifying the at least one video content, the set of information being determined from the one or more first attributes and the one or more second attributes; and
  incorporating the set of information into the file name;
locating, by the controller, the digital file associated with the at least one video content according to the generated file name, the digital file being located over a network communicatively coupled to the corresponding server; and
retrieving over the network, by the controller, the digital file associated with the at least one video content according to the generated file name; and
transmitting, with the controller, the plurality of video content via a transmission system to at least one end-user device at the respective broadcast times,
wherein the broadcast schedule specifies transmissions for a plurality of segments of a television show at respective broadcast times and at least one advertisement between two of the segments of the television show, and
the set of information determined from the one or more first attributes and the one or more second attributes identifies the plurality of segments of the television show.

2. The method of claim 1, further comprising:
obtaining, from the one or more data storage hardware and by the controller, a third set of rules that generates a location name for storing the digital file associated with the at least one video content; and
generating, by the controller, the location name for the digital file associated with the at least one video content by applying the third set of rules to the one or more first attributes, including:
  determining a second set of information identifying the at least one video content, the second set of information being determined from the one or more first attributes; and
  incorporating the second set of information into the location name;
wherein the digital file associated with the at least one video content is further located and retrieved over the network, by the controller, according to the generated location name.

3. The method of claim 1, wherein the broadcast schedule specifies the transmission of a plurality of video content from a plurality of video content providers, and the plurality of video content providers store digital files associated with the plurality of video content on different corresponding servers.

4. The method of claim 1, wherein the digital file associated with the at least one video content is retrieved in its entirety before the at least one video content is transmitted via the transmission system.

5. A video-broadcast system, the system comprising:
one or more data storage hardware configured to store:
  (i) a broadcast schedule specifying transmission of a plurality of video content at respective broadcast times, the broadcast schedule specifying one or more first attributes for each video content;
  (ii) a first set of rules that generates a file name for a digital file associated with at least one of the video content, the digital file associated with the at least one video content being stored on a corresponding server according to the file name, wherein the file name is not specified by the broadcast schedule; and
  (iii) a second set of rules that generate, from the one or more first attributes, one or more second attributes that are not specified by the broadcast schedule; and
a controller communicatively coupled, over a network, to the server corresponding to the at least one video content and configured to:
  (i) determine, from the broadcast schedule, the one or more attributes for the at least one video content;
  (ii) apply the second set of rules to the one or more first attributes to generate the one or more second attributes;
  (iii) generate the file name for the digital file associated with the at least one video content by applying the first set of rules to the one or more first attributes and the one or more second attributes, including:
    determining a set of information identifying the at least one video content, the set of information being determined from the one or more first attributes and the one or more second attributes; and
    incorporating the set of information into the file name;
  (iv) locate, over the network communicatively coupled to the corresponding server, the digital file associated with the at least one video content according to the generated file name;
  (v) retrieve, over the network, the digital file associated with the at least one video content according to the generated file name; and
  (vi) transmit the plurality of video content via a transmission system to at least one end-user device at the respective broadcast times,
wherein the broadcast schedule specifies transmissions for a plurality of segments of a television show at respective broadcast times and at least one advertisement between two of the segments of the television show, and
the set of information determined from the one or more first attributes and the one or more second attributes identifies the plurality of segments of the television show.

6. The video-broadcast system of claim 5, wherein the one or more data storage hardware is further configured to store a third set of rules that generates a location name for storing the digital file associated with the at least one video content; and
the controller is further configured to:
  (i) generate the location name for the digital file associated with the at least one video content by applying the third set of rules to the one or more first attributes, including:
    determining a second set of information identifying the at least one video content, the second set of information being determined from the one or more first attributes; and
    incorporating the second set of information into the location name; and
  (ii) further locate and retrieve, over the network, the digital file associated with the at least one video content according to the generated location name.

7. The video-broadcast system of claim 5, wherein the broadcast schedule specifies the transmission of a plurality of video content from a plurality of video content providers, and the plurality of video content providers store digital files associated with the plurality of video content on different corresponding servers.

8. The video-broadcast system of claim 5, wherein the controller retrieves the digital file associated with the at least one video content in its entirety before transmitting the at least one video content via the transmission system.

9. A non-transient computer readable medium for a video-broadcast system, the video-broadcast system including one or more data storage hardware configured to store:
  (i) a broadcast schedule specifying transmission of a plurality of video content at respective broadcast times, the broadcast schedule specifying one or more attributes for each video content;
  (ii) a first set of rules that generates a file name for a digital file associated with at least one of the video content, the digital file associated with the at least one video content being stored on a corresponding server according to the file name, wherein the file name are not specified by the broadcast schedule;
  (iii) a second set of rules that generate, from the one or more first attributes, one or more second attributes that are not specified by the broadcast schedule; and
  the computer readable medium containing program instructions for causing a controller to perform the method of:
  determining, from the broadcast schedule, the one or more first attributes for the at least one video content;
  applying the second set of rules to the one or more first attributes to generate the one or more second attributes;
  generating the file name for the digital file associated with the at least one video content by applying the first set of rules to the one or more first attributes and the one or more second attributes, including:
    determining a set of information identifying the at least one video content, the set of information being determined from the one or more first attributes and the one or more second attributes; and
    incorporating the set of information into the file name;
  locating, over the network communicatively coupled to the corresponding server, the digital file associated with the at least one video content according to the generated file name;
  retrieving, over the network, the digital file associated with the at least one video content according to the generated file name; and
  transmitting the plurality of video content via a transmission system to at least one end-user device at the respective broadcast times,
  wherein the broadcast schedule specifies transmissions for a plurality of segments of a television show at respective broadcast times and at least one advertisement between two of the segments of the television show, and the set of information determined from the one or more first attributes and the one or more second attributes identifies the plurality of segments of the television show.

10. The non-transient computer readable medium of claim 9, wherein the one or more data storage hardware further stores a third set of rules that generates a location name for storing the digital file associated with the at least one video content; and
  the computer readable medium contains further program instructions for causing the controller to perform the method of:
  generating the location name for the digital file associated with the at least one video content by applying the third set of rules to the one or more first attributes, including:
    determining a second set of information identifying the at least one video content, the second set of information being determined from the one or more first attributes; and
    incorporating the second set of information into the location name; and
  further locating and retrieving, over the network, the digital file associated with the at least one video content according to the generated location name.

11. The non-transient computer readable medium of claim 9, wherein the broadcast schedule specifies the transmission of a plurality of video content from a plurality of video content providers, and the plurality of video content providers store digital files associated with the plurality of video content on different corresponding servers.

12. The non-transient computer readable medium of claim 9, wherein the digital file associated with the at least one video content is retrieved in its entirety before the at least one video content is transmitted via the transmission system.

* * * * *